United States Patent [19]

Kurelek

[11] 4,148,526
[45] Apr. 10, 1979

[54] APPARATUS FOR SORTING TREES
[75] Inventor: John Kurelek, Brantford, Canada
[73] Assignee: Koehring Canada Limited, Brantford, Canada
[21] Appl. No.: 869,281
[22] Filed: Jan. 13, 1978
[51] Int. Cl.² .............................................. B60P 1/28
[52] U.S. Cl. .................................. 298/8 R; 144/3 D; 298/17 R; 298/18
[58] Field of Search ............... 214/77 R, 80; 298/8 R, 298/17 R, 17.7, 18; 280/145; 209/122; 144/3 D, 309 AC; 105/261 R, 263, 269, 381

[56] References Cited
U.S. PATENT DOCUMENTS

| 2,161,734 | 6/1939 | Wheless | 144/3 D X |
| 2,728,588 | 12/1955 | Zepik | 280/145 |
| 3,623,521 | 11/1971 | Shields | 144/3 D X |
| 3,720,336 | 3/1973 | Murray et al. | 298/8 R X |
| 3,797,541 | 3/1974 | Kurelek et al. | 144/3 D |

Primary Examiner—L. J. Paperner
Attorney, Agent, or Firm—Sim & McBurney

[57] ABSTRACT

Apparatus is provided for sorting trees in situ in the forest immediately after being cut, the steps of limbing and topping optionally being included prior to the sorting operation. To this end a vehicle is provided having at least four dumping bunks. Trees of different sizes or species are loaded into the different bunks. The inner two bunks dump to the rear of the vehicle, while the outer two bunks dump to the sides of the vehicle.

6 Claims, 4 Drawing Figures

APPARATUS FOR SORTING TREES

CROSS REFERENCE TO RELATED APPLICATIONS

This application is related to co-pending application Ser. No. 869,022 filed Jan. 12, 1978, in the names of John Kurelek and John Charles Gray entitled METHOD AND APPARATUS FOR SORTING TREES.

BACKGROUND OF THE INVENTION

This invention relates to apparatus for sorting trees. More particularly, this invention relates to the sorting of trees in a forest immediately after the trees have been cut down, or immediately after they have been cut down, limbed and, optionally, topped, using a vehicle provided with multiple dumping bunks each for receiving trees of different types or of different sizes.

After trees have been harvested, and before they are put to their final use as lumber or pulpwood, for example, it is necessary to sort the trees. The sorting operation may be simply to separate trees destined for lumber from those which are destined for papermaking. The sorting operation also may be to separate hardwood from softwood. Also the sorting operation may be to separate the trees into different lengths or different trunk diameters. Alternatively, the sorting operation may be to separate coniferous trees from deciduous trees.

In the past equipment that is capable of being used to sort trees has not been used to permit sorting of the trees at the harvesting site. As a consequence, the tree sorting operation has taken place at other locations where, for various reasons, it has been more difficult to perform than at the harvesting site. For example, various types of trees may be harvested in a forest, limbed, topped and forwarded to a landing site where they may be piled awaiting transportation to a pulp mill or to a lumber mill. The sorting operation may take place at the landing site. The tree trunks will be randomly piled with trunks of different lengths and diameters scattered throughout the pile. In order to sort the pile into trunks of different lengths or trunks of different diameters, the whole pile will have to be disrupted and rearranged. The same is true if the sorting is an operation to separate different species of trees. In that case, however, there may exist the additional problem of identifying the different species. In this respect, identification by the relatively untrained eye of various different species of pines, for example, is much easier when the trees have their pine needles than after the limbs of the trees have been removed.

Thus, in accordance with this invention there is provided apparatus for the sorting of trees at the tree harvesting site when the trees can be most efficiently sorted.

SUMMARY OF THE INVENTION

In accordance with one aspect of this invention there is provided apparatus for receiving trees that have been sorted according to different physical characteristics comprising a mobile vehicle including a frame having a front, a rear and two sides, said vehicle including at least four bunks adapted to receive trees and mounted on said frame in side-by-side relationship with a first and a second of said bunks being located adjacent respective sides of said frame and third and fourth of said bunks being located between said first and second bunks, said first and second bunks being movably mounted on said frame and constructed and arranged to dump their contents to the sides of said frame, said third and fourth bunks being movably mounted on said frame and constructed and arranged to dump their contents to the rear of said frame, and means for independently moving each of said bunks between a first position where trees can be loaded into and retained in said bunks and a second position where trees in said bunks will be dumped therefrom.

DETAILED DESCRIPTION OF THE INVENTION INCLUDING THE PREFERRED EMBODIMENT

Figure 1:
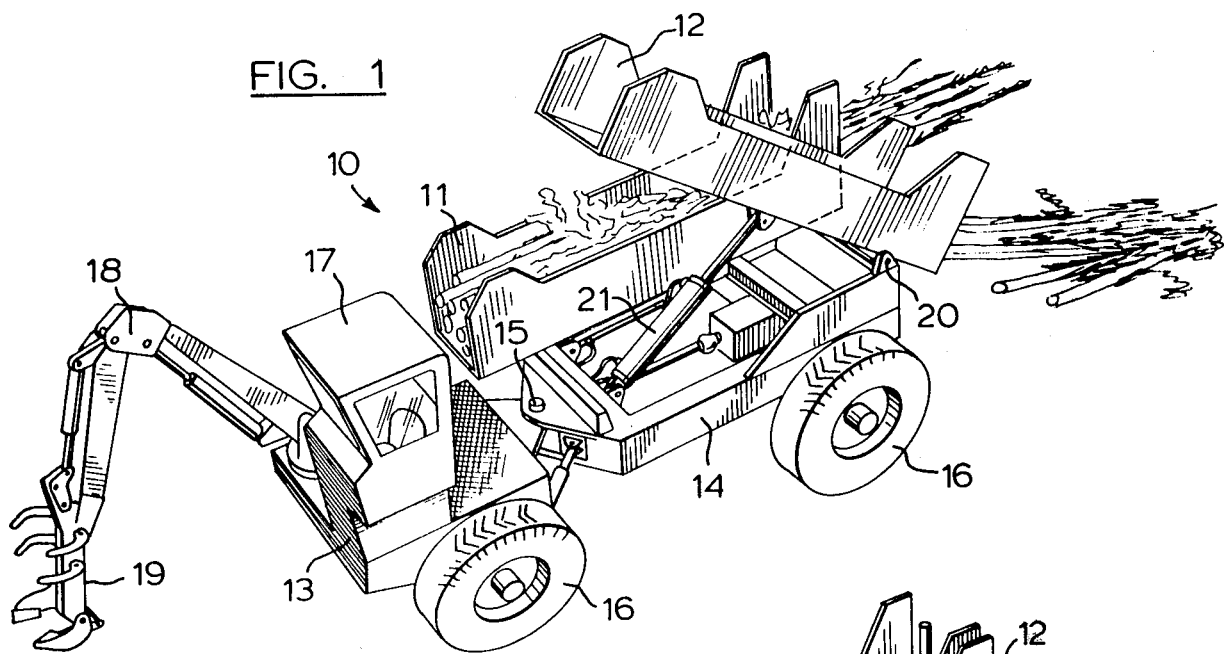
FIG. 1 is a perspective view of a feller forwarder that may be used for sorting trees.

Referring to FIG. 1 there is shown a feller forwarder vehicle 10 that may be used for sortng trees. The basic feller forwarder 10 may be of known type, e.g., a Koehring (trade mark) KFF Feller Forwarder, modified by the inclusion of two dumping bunks 11 and 12 in place of the single bunk conventionally used. The feller forwarder of the type illustrated is an articulated vehicle having front and rear sections 13 and 14 pivoted at 15, four wheels 16 (only two of which are shown), an operator's cab 17, a knuckle boom 18 pivoted on the vehicle frame and a head 19 pivoted on the boom and capable of grasping, cutting and lifting a tree. The vehicle also includes suitable hydraulic mechanisms for operating the boom and head, a main drive motor, transmissions, etc., but as the basic vehicle is commercially available, no detailed description thereof is required.

A conventional Koehring KFF Feller Forwarder is provided with a single dumping bunk for receiving trees cut by the cutting shear or chain saw of head 19. A feller forwarder that can be used for sorting trees is provided with at least two dumping bunks. Referring to the vehicle shown in FIG. 1 there are only two dumping bunks 11 and 12. These bunks are pivoted to the vehicle frame at 20 and can be moved into dumping position by means of a hydraulically operated cylinder and piston arrangement 21 or any other suitable operating mechanism.

In the case of the vehicle shown in FIG. 1 bunks 11 and 12 dump to the rear of the vehicle about a horizontal axis parallel to the rear of the vehicle and perpendicular to its longitudinal axis. Typically bunks 11 and 12 may be elevated to about a 50° angle when in the dumping position.

In the case of the vehicle illustrated in FIG. 1, the bunks are generally U-shaped in cross-section and are open at both ends so as to be capable of accommodating long trees. Typically a bunk would have a capacity of 3 to 7 cords.

In an embodiment of the instant invention two additional bunks similar to bunks 11 and 12 may be mounted on the rear section 14 of the vehicle to the outside of bunks 11 and 12 respectively. The outer bunks may be arranged to pivot on the vehicle frame about horizontal axes arranged parallel to the longitudinal axis of the vehicle. Thus, the outer bunks are arranged to dump sideways, rather than to the rear of the vehicle, suitable operating mechanisms for performing the dumping operation and returning the outer bunks to their normal positions being provided. As in the case of bunks 11 and 12, these operating mechanisms may consist hydraulically operated cylinder and piston arrangements.

Figure 2:
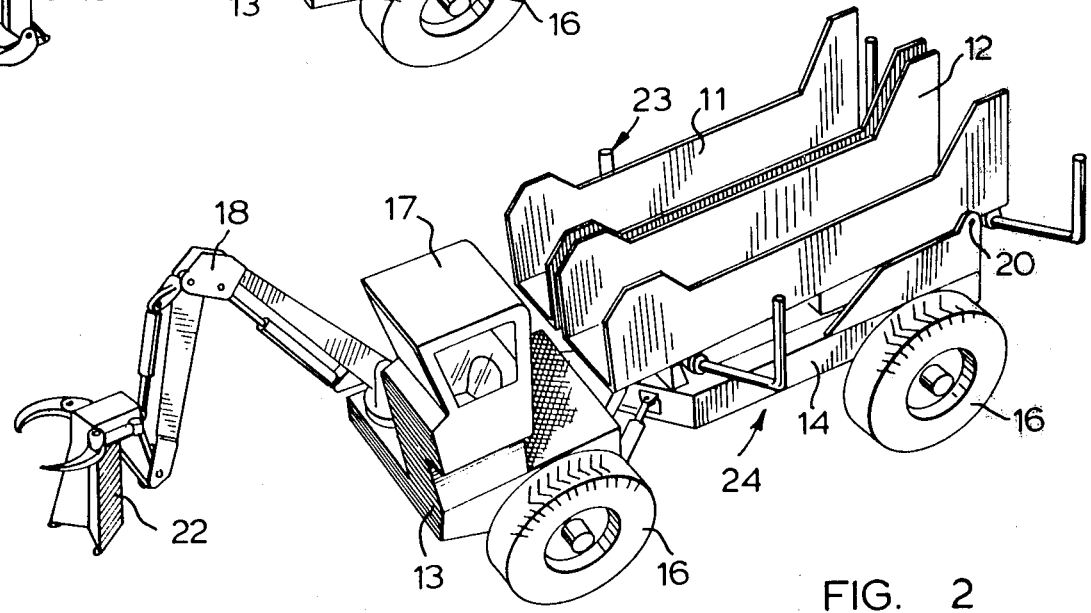
FIG. 2 is a perspective view of a loader forwarder embodying this invention.
Figure 3:
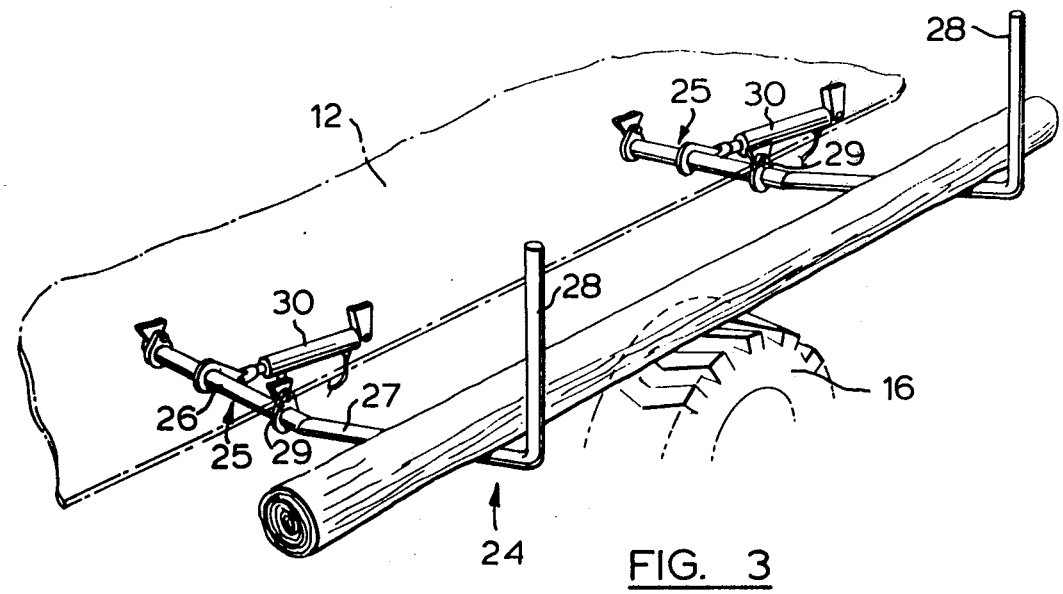
FIGS. 3 and 4 are detail views of a part of the loader forwarder of FIG. 2 showing how trees may be unloaded from the side bunks thereof.
Figure 4:
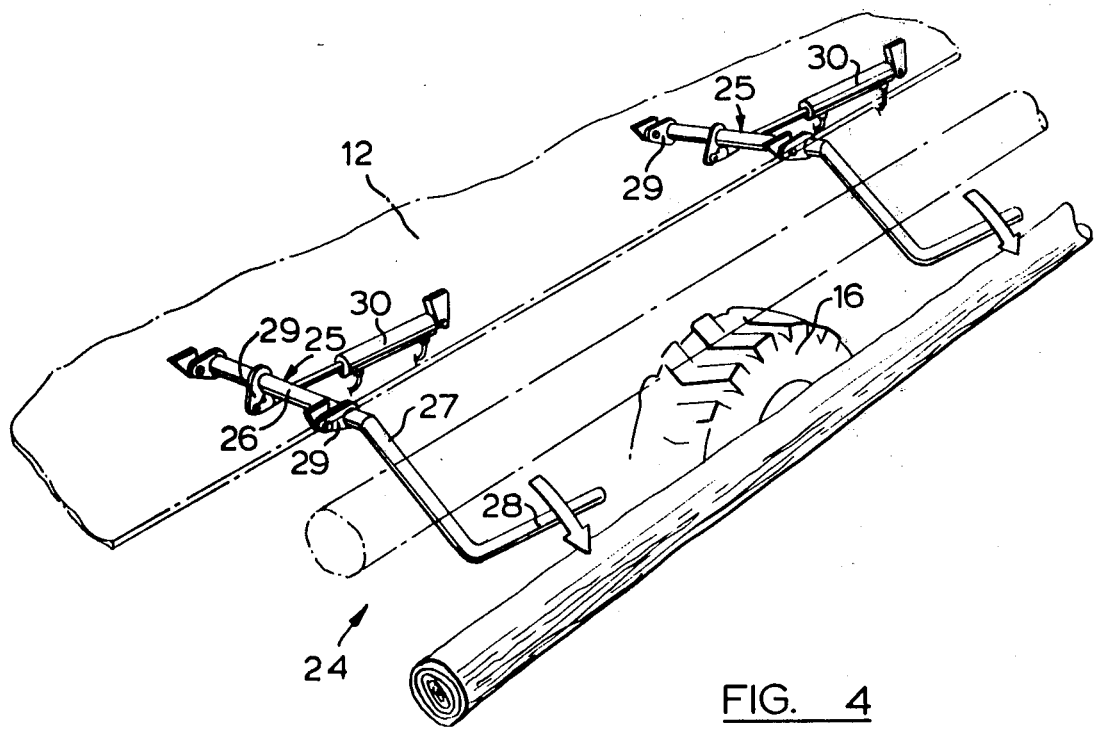

In the embodiment of the invention shown in FIG. 2 head 19 is replaced by a tree grapple 22 and side bunks 23 and 24 are provided. Of course the vehicle of FIG. 2 may have a head 19 in place of grapple 22 if desired. The two side bunks and the side bunk operating mechanisms are the same, so only one will be described. Thus, as shown in FIGS. 3 and 4, side bunk 24 is mounted on bunk 12. On the other hand side bunk 23 is mounted on bunk 11.

Bunk 24 consists of two shafts 25 each including, in the position thereof shown in FIG. 3, a horizontal section 26 extending perpendicular to the longitudinal axis of vehicle 10, a horizontal, forwardly inclined section 27 and an upstanding section 28.

Each section 26 is pivotably mounted on the underside of bunk 12 and is provided with a crank arm 29 to enable bunk 24 to be moved to the load dumping position shown in FIG. 4 by any suitable operating mechanism such as hydraulically operated cylinder and piston arrangement 30.

When shafts 25 are in the position shown in FIG. 3, trees can be loaded into and retained in bunk 24. When shafts 25 are rotated to the position shown in FIG. 4 trees will be dumped from bunk 24 to the side of vehicle 10. Of course, if desired bunk 24 may be lifted with bunk 12 to the position shown in FIG. 1 and trees in bunk 24 dumped to the rear of the vehicle.

In using the equipment shown, feller forwarder 10 is driven into the forest, which may contain mixed wood, and is used in a conventional way to cut down trees. In this respect, and as is conventional, boom 18 is moved to bring head 19 into engagement with a tree. Tree gripping arms of head 19 engage the tree, which then is cut using a saw or shear constituting a part of head 19. Boom 18 is activated again to swing the cut tree over one of the bunks, the tree gripping arms are released and the cut tree is permitted to fall into the selected bunk.

At some time during the operation just described the operator determines into which bunk the tree will be deposited and then deposits the tree into that bunk, effecting the sorting operation. As noted hereinbefore, the sorting operation may be by size or specie. Thus, for example, hardwood trees may be piled in bunk 11 and softwood trees in bunk 12. Alternatively, trees over, say 60′ in length may be piled in bunk 11, and trees less than 60′ in length in bunk 12, or trees havng less than, say 4″ in diameter trunks may be piled in bunk 11, and trees with larger diameter trunks may be piled in bunk 12. In any even the sorting operation takes place in situ at the tree harvesting site and immediately following the actual cutting operation.

Alternatively, a Koehring Tree-length or Loader Forwarder modified to incorporate two or more bunks for tree storage and preferably provided with its own grapple for picking up trees to be loaded into the bunks may be employed. This forwarder is driven into the forest where trees are being cut. At the harvesting site the trees are lifted by the grapple and placed in selected ones of the bunks as determined by the operator of the forwarder, thereby accomplishing the sorting operation in situ at the harvesting site. In this case the tree sorting operation may take place before or after the limbing operation, the latter being accomplished, for example, at the landing site to which the forwarder will take the trees. In the case where the sorting operation is to separate trees of different species, particularly in the case where the species are of the same classification, for example, coniferous, preferably the sorting operation is carried out before the limbing operation to assist the person making the selection identify the different species of trees.

As a further alternative, tree harvesting equipment of the general type disclosed, for example, in U.S. Pat. No. 3,875,983, issued Apr. 8, 1975, John Kurelek, assigned to Koehring Canada Limited, modified by the inclusion of two or more bunks and provided with some suitable means for selectively transferring the cut, limbed and topped trees to the desired bunk could be employed. In this case the sorting step would follow the cutting, limbing and topping operations, but there would be no problem in effecting the sorting operation, even if it is based on species, since the operator will be able to readily identify the species of tree that is being dealt with at the time that the cutting operation is being performed and will determine at that time into which bunk the processed trees should be loaded.

U.S. Pat. No. 3,875,983 is incorporated herein by reference.

In all embodiments of the invention a mobile vehicle provided with at least four bunks is provided at the tree harvesting site. Preferably the vehicle is provided with some mechanism to load trees into the bunks, the latter being capable of dumping.

Vehicles having two or more load-carrying containers, some of which are arranged to dump, are known, as is evident from the following U.S. Pat. Nos.:

3,841,234 issued Oct. 15, 1974, T. J. Nicolletti,
1,445,215 issued Feb. 13, 1923, C. A. Holt, Jr.,
666,567 issued Jan. 22, 1901, C. Skone,
3,371,939 issued Mar. 5, 1968, A. G. Welk,
273,202 issued Feb. 27, 1883, W. Wallace,
3,720,336 issued Mar. 13, 1973, Murray et al.

It will be apparent from a reading of these patents that none discloses equipment specifically for the purpose set out herein, or contemplates using the equipment for in situ tree sorting.

It will be seen from the foregoing that in using equipment embodying this invention for sorting trees at a tree harvesting site where the trees are felled, a mobile vehicle is provided at the site, this vehicle having at least four bunks for receiving trees. Trees felled at the site which differ in predetermined physical characteristics are loaded at the site into different ones of the bunks. In one case the physical characteristic may be length, with trees of shorter length being loaded into some of the bunks and trees of greater length being loaded into others of the bunks. Alternatively the physical characteristic may be trunk diameter, trees of smaller trunk diameter being loaded in some of the bunks and trees of larger trunk diameter being loaded in others of the bunks. If the physical characteristic is tree specie, trees of one specie may be loaded in one of the bunks and trees of different species may be loaded in others of the bunks. The species may be softwood on the one hand and hardwood on the other hand or coniferous trees on the one hand and deciduous trees on the other hand.

Alternatively the trees are felled at the site and loaded into the bunks, the felling operation being performed by equipment associated with the mobile vehicle carrying the bunks or independent from that vehicle. In a further modification of this method the trees are limbed before being loaded into the bunks, and in another modification the trees are topped before the loading operation, the topping operation generally following the limbing step.

Attention is directed to the fact that the methods described herein and the apparatus shown in Fig. 1 are described and claimed in the aforementioned co-pending U.S. patent application.

While preferred embodiments of this invention have been described and illustrated herein, those skilled in the art will appreciate that changes and modifications may be made therein without departing from the spirit and scope of this invention as defined in the appended claims.

What is claimed is:

1. Apparatus for receiving trees that have been sorted according to different physical characteristics comprising a mobile vehicle including a frame having a front, a rear and two sides, said vehicle including at least four bunks adapted to receive trees and mounted on said frame in side-by-side relationship with a first and a second of said bunks being located adjacent respective sides of said frame and third and fourth of said bunks being located between said first and second bunks, said first and second bunks being movably mounted on said frame and constructed and arranged to dump their contents to the sides of said frame, said third and fourth bunks being movably mounted on said frame and constructed and arranged to dump their contents to the rear of said frame, and means for independently moving each of said bunks between a first position where trees can be loaded into and retained in said bunks and a second position where trees in said bunks will be dumped therefrom.

2. Apparatus according to claim 1 wherein said third and fourth bunks are pivotably mounted on said frame, about pivot axes adjacent the rear of said frame, said pivot axes being substantially perpendicualr to the longitudinal axes of said third and fourth bunks.

3. Apparatus according to claim 2 wherein said third and fourth bunks each have a front end and a rear end, said pivot axes being adjacent said rear ends of said third and fourth bunks, said means for moving said third and fourth bunks comprising means for pivoting said third and fourth bunks about said pivot axes to raise said front ends of said third and fourth bunks relative to said rear ends of said third and fourth bunks.

4. Apparatus according to claim 3 wherein said first and second bunks are pivotably mounted on said third and fourth bunks respectively.

5. Apparatus according to claim 3 wherein said first and second bunks are rotatable bent arms.

6. Apparatus according to claim 3 wherein said first and second bunks are rotatable bent arms, said arms being rotatably mounted on said third and fourth bunks.

* * * * *